Aug. 10, 1926.
A. H. MERRILL
1,595,561
SELF RELEASING TRAP NEST
Filed August 19, 1925
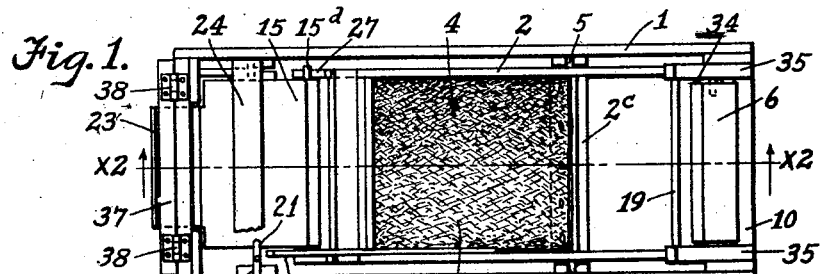
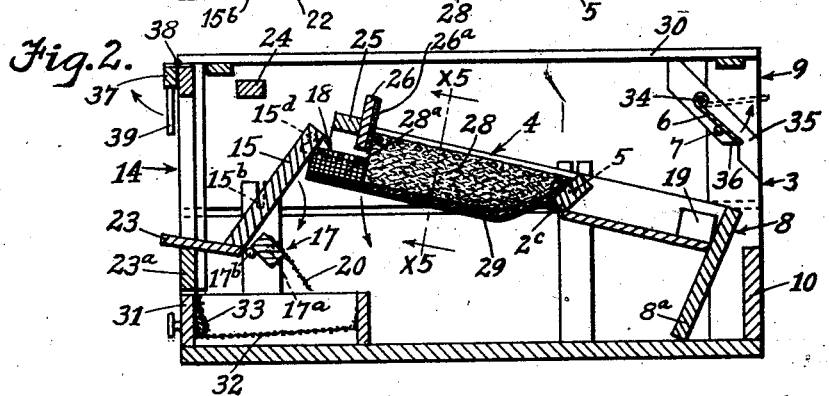
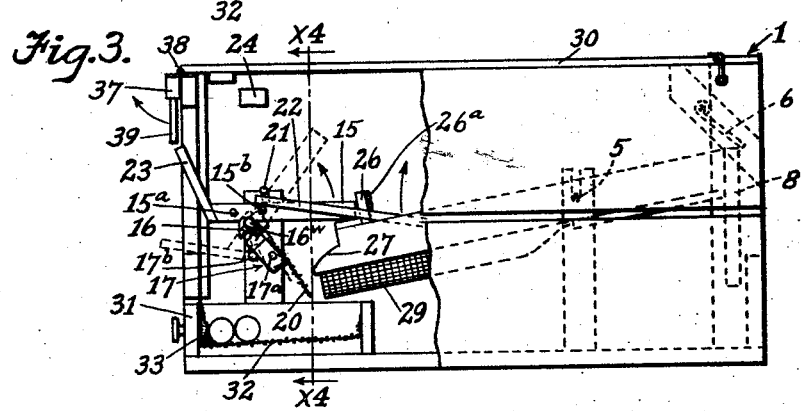
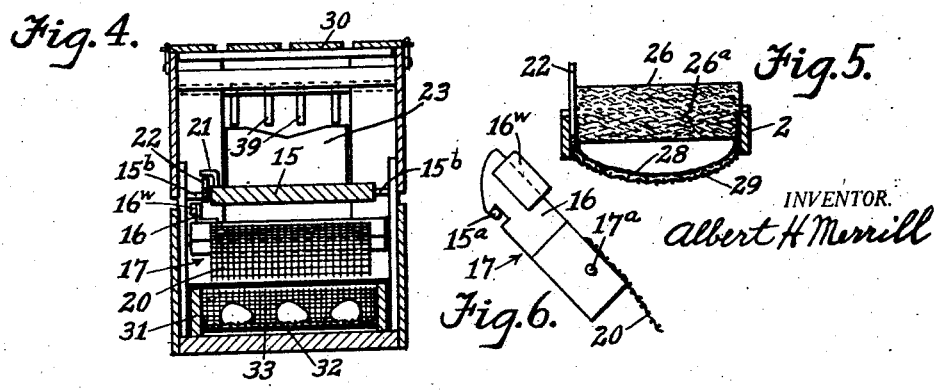
INVENTOR.
Albert H Merrill Patented Aug. 10, 1926.

1,595,561

UNITED STATES PATENT OFFICE.

ALBERT H. MERRILL, OF LOS ANGELES, CALIFORNIA.

SELF-RELEASING TRAP NEST.

Application filed August 19, 1925. Serial No. 51,153.

This invention relates to that type of trap nest wherein fowls that enter the nest without laying therein may pass back into the yard from which they enter, but when a fowl lays an egg within the nest the weight of the egg or else the impact thereof as it passes from the nest proper, controls an exit provided to conduct fowls that have laid to a separate enclosure, thus automatically separating the layers from the non-layers.

Thus far a trap nest of this character has not come into general use, apparently because the expense of manufacture has been too great. Lessening cost of manufacture without impairing durability and positiveness of operation is an important object of this invention.

Other objects and advantages will hereinafter appear.

Referring to the accompanying drawings which illustrate a preferred embodiment of the invention, Fig. 1 is a plan view of the device, the cover being removed to show interior parts; Fig. 2 is a longitudinal mid-section, including the cover, on line $X^2$—$X^2$ of Fig. 1 showing position when not occupied by a fowl; Fig. 3 is a side elevation, part of the casing being broken away, showing position of parts when a hen has laid an egg in the nest but has not yet gone out the exit; Fig. 4 is a transverse section on line $X^4$—$X^4$ of Fig. 3; Fig. 5 is a transverse section of the nest proper on line $X^5$—$X^5$ of Fig. 2; Fig. 6 is an enlarged detail of the egg-operated device.

Referring in detail to the drawings, within an elongated casing 1 is a tilting member 2 the front portion of which is adapted at certain times to obstruct the door opening 3 sufficiently to prevent the passage of fowls therethrough in either direction, but tending at all times to tilt down and allow a fowl to enter and pass to the nest proper 4 which is located rearwardly of the pivotal support 5 of said member 2. As the door opening 3 not only allows fowls to enter the casing but to depart therefrom in case they do not lay this opening will often be termed the entrance-exit opening or simply the entrance-exit.

In said door opening 3 is an auxiliary door 6, preferably a plate pivoted or hinged to swing outwardly from said door opening on a horizontal axis as indicated in dotted lines in Fig. 2. Said door 6 normally rests upon a stop 7 at a downward and forward inclination in which position it co-operates with the closure member 8 at the front end of tilting member 2 to close the entrance-exit 3 completely except that a light and air opening 9 is preferably maintained at all times above said auxiliary door 6. The outward and downward inclination of said door 6 does not interfere with fowls entering because they step up from the ground or from a low step (not shown) which enables them readily to crowd up under swinging door 6 and to raise the free end thereof as indicated. Auxiliary door 6 lessens the amount of tilting movement of member 2 necessary to control passage of fowls through the entrance-exit opening.

At the rear end of the casing is the layer's exit opening 14 controlled by the layer's exit door 15, tending to fall to open position but being normally held in closed position by catch 16 which forms part of pivoted egg-operated device 17. The nest proper 4 has at its rear end an egg-discharge opening or passage 18. When a hen is on the nest her weight overcomes counterbalancing weight 19 located on the other side of trunnions 5 and brings the rear end of the tilting member down thus inclining the nest proper in a manner which favors discharge of the egg therefrom against screen apron 20, thus rocking egg-operated device 17 on its pivots 17$^a$ together with catch 16 and permitting exit door 15 to fall to open position. Said door 15 has a screw hook 21 or other catch element which interlocks with an arm 22 of the tilting member to retain said tilting member with the rear end thereof depressed whenever layer's exit door 15 is down, that is in the open position. When a fowl leaves the nest after laying, she steps upon an angular treadle portion 23 of door 15, thus restoring said door to the closed position in which it is normally retained by the egg-operated catch 16, which engages stud 15ª of said door 15. The body portion of door 15 may consist of a thick board into the edges of which trunnion pins 15ᵇ are driven near its upper face and, as seen in Fig. 2, somewhat nearer the lower than the upper end. The treadle 23 may be a thinner board secured to the door at an obtuse angle, so that when it arrests closing movement of the door by engaging doorsill 23ª the body portion of the door occupies an inclined position from which it readily falls when released by egg-operated catch 16.

A cross bar 24 obstructs sufficiently the space above exit door 15 to prevent escape of a fowl when said door is closed, said door then being inclined as shown in Fig. 2.

When the tilting member 2 is made of wood it is preferably constructed as a trough rectangular in cross-section, having at its rear end a transverse brace 25 provided with a shield or guard 26 to keep the fowl from stroking the egg-operated element with her tail or otherwise operating the catch 16 and prematurely opening layer's exit door 15. A rearwardly extending arm 27 of the tilting member is adapted to contact with pin 15ᵃ of door 15 to complete the closure thereof automatically in case the fowl does not completely close said door in passing out through the layer's exit.

Within the nest proper is desirably placed burlap or other nesting material 28 supported by a rather coarse screen 29. Near the rear end of the tilting member there is preferably left an uncovered area 28ª to facilitate the discharge of the eggs. Guard 26 may have a facing 26ª. 2ᶜ designates a crosspiece within the tilting member. The trunnions 5 extend into the ends of this crosspiece. Said crosspiece is inclined to present a smooth surface toward the body of a fowl on the nest.

Referring again to the closure member 8 at the front end of tilting member 2, this part may have a downwardly extending portion 8ª, which is of proper length to abut against the floor of the casing when the front end of the tilting member is fully depressed. Said portion 8ª of door 8 forms a guard which prevents fowls from crowding under the front end of the tilting platform when the entrance door 8 is closed.

30 designates a cover which may be removed to allow the nest to be cleaned. When the nests are built into tiers, as is well known in the art, no cover will be required except for the upper nest of a tier.

The egg-drawer 31 is provided with a slightly inclined screen bottom 32 and a shock absorber 33 at its rear end against which the eggs roll. Said shock absorber is desirably made of screen bent into a loop as shown.

The auxiliary entrance door 6 is preferably pivoted on a shaft 34 between blocks 35, said blocks serving to restrict the width of the entrance, thus providing an additional safeguard against two fowls entering at the same time. Said blocks 35 are provided with shoulders 36 to limit the upward movement of closure member 8.

Above the layer's exit 14 may be mounted an outwardly swinging guard or auxiliary exit door 37 to keep fowls that have laid from attempting to re-enter the nest, especially when the main exit door 15 is open, as seen in Fig. 3. Said door 37 is hinged at 38 and is provided with pendant arms 39 which give an open appearance to the exit to encourage the fowls to pass out thereat after laying.

Operation: A fowl standing on the ground or other support near the level of the bottom of the casing readily thrusts her head and neck under the auxiliary entrance door 6, and as she steps up to enter swings said door 6 up and out, making room for her to enter. When she passes beyond the pivotal support 5 of the tilting member 2, her weight moves the main closure member 8 up until the upper edge thereof substantially meets the lower edge of auxiliary door 6, thus completely closing the entrance exit opening, preventing entrance of another fowl. If the fowl, without laying an egg, returns to the entrance-exit opening and attempts to escape by thrusting her head through the space 9 above auxiliary door 6, doing this will bring the weight of her body sufficiently near to the front end of the tilting member to cause that end to descend. She may then withdraw her head and pass out beneath auxiliary door 6.

When a fowl enters the nest proper and lays an egg therein, the egg rolls down the inclined nest bottom and, by striking the apron 20 of the egg-operated device thereby withdraws catch 16, thus permitting layer's exit door 15 to fall to the open position in which the locking hook 21, having swung up over the end of arm 22 of the tilting member 2 locks said member, making it impossible for the fowl to depress the front end thereof and escape through the entrance-exit door. Finding that she cannot do this, she will pass out the layer's exit door, depressing the treadle portion 23 thereof, thus closing said door and at the same time withdrawing locking hook 21 from over the end of arm 22, permitting the tilting member to reassume normal position, thus opening the entrance-exit door to allow another fowl to enter.

I have illustrated and described an embodiment of the invention designed to be constructed principally of wood, but the skilled workman will readily make the minor changes necessary in order to substitute metal for wood wherever such a change may be found desirable.

I claim:

1. In a trap nest a casing having an exit opening and an entrance-exit opening, a tilting platform within said casing, said platform being provided with a vertically movable door integral therewith to close said entrance-exit opening sufficiently to prevent passage of fowl therethrough, a pivotal support for said platform, the weight of said platform with respect to its pivot being such as normally to maintain said entrance-exit opening passable to fowls and a nest proper on said platform between its pivotal mounting and said exit opening, said platform being operable by the weight of a fowl on said nest to close said entrance-exit opening.

2. In a trap nest, a casing having an entrance opening and an exit opening, a tilting platform operable by the weight of a fowl to close said entrance opening when a fowl passes from said entrance opening along said platform to a point beyond the pivotal mounting thereof, an exit door, an egg-operable device to open said exit door, means whereby said exit door when open locks said platform in the position wherein said entrance opening is maintained closed thereby, and means to automatically close said exit door when the fowl passes out thereat.

3. In a trap nest, a casing having an entrance opening, a door movable upwardly by the weight of a fowl to lessen the vertical extent of said opening, and an auxiliary door above the first mentioned door to cooperate therewith to prevent a fowl from entering said casing while another is therein.

4. In a trap nest, a casing having an entrance opening, an auxiliary door for said opening, a stop upon which said door normally rests at a downward and outward inclination from said casing, and another door below said auxiliary door to co-operate therewith, said lower door being movable up to a position wherein said auxiliary door normally prevents it from being moved down by fowls attempting to enter.

5. In a trap nest, a casing having an entrance-exist opening, a door movable upwardly to decrease the vertical extent of said opening, there being above said entrance opening an auxiliary opening of sufficient size to permit a hen to extend her head therethrough, auxiliary closure means between said openings, and means to open said upwardly movable door, said last named means functioning when the body of a fowl within said casing is sufficiently near said auxiliary opening to permit her to extend her head therethrough.

6. In a trap nest, a casing having an entrance-exit opening an auxiliary door for said opening, said door being mounted to swing on a substantially horizontal axis, a stop whereon said door normally rests in a downwardly and outwardly inclined position with respect to said casing, a main door for said entrance-exit opening, and means for moving said main door to and from a position wherein said auxiliary door in its normal position co-operates to completely close said entrance-exit opening.

7. In a trap nest, an exit door normally tending to move from closed to open position and egg operated means to release said door to open the same automatically, said door having a treadle portion operable by the fowl to close said door.

8. In a trap nest, a casing having an entrance-exit opening, a door movable upwardly to decrease the vertical extent of said opening, there being above said opening an auxiliary opening of sufficient size to permit a hen to extend her head therethrough, and means to move downwardly said upwardly movable door, said last named means functioning whenever the body of a fowl within said casing is sufficiently near said auxiliary opening to permit her to extend her head therethrough.

9. In a trap nest, an entrance-exit door forming part of a tilting member operable by a fowl's weight, a nest proper in fixed relation to said tilting member, and an exit door provided with means to engage said tilting member to lock said entrance-exit door in closed position when said exit door is open.

10. In a trap nest, an entrance-exit door forming part of and in fixed relation to a tilting member operable by a fowl's weight, and an exit door provided with a hook to engage said titling member to lock said entrance-exit door in closed position when said exit door is open.

11. In a trap nest, a tilting member operable by the weight of a fowl, a nest proper in fixed relation to said tilting member, an exit door normally tending to fall to open position, a catch to normally hold said exit door closed, and egg-operated means to release said catch, said tilting member being adapted to automatically close said exit door as the fowl leaves the nest.

12. In a trap nest, a tilting member operable by the weight of a fowl, a nest proper in fixed relation to said tilting member, an exit door normally tending to fall to open position, a catch to normally hold said exit door closed, egg-operated means to release said catch, and means extending from said tilting member to engage beneath and lift said exit door to closed position.

13. In a trap nest, a casing having an entrance-exit opening, a tilting member one end of which moves up and down adjacent said opening, and a door carried by that end of said tilting member to move up and down therewith, said door having a downwardly extending portion to guard against fowls obstructing the downward movement thereof.

14. In a trap nest, an exit door having a body portion and a treadle portion extending from said body portion at an obtuse angle, means to normally maintain said door closed with said body portion thereof at an inclination, and egg-operated means to release said door and permit it to fall to open position.

ALBERT H. MERRILL.